(12) United States Patent  (10) Patent No.: US 8,320,115 B2
Sun  (45) Date of Patent: Nov. 27, 2012

(54) MOUNTING APPARATUS FOR DISK DRIVE (75) Inventor: Zheng-Heng Sun, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 283 days.

(21) Appl. No.: 12/845,641

(22) Filed: Jul. 28, 2010

(65) Prior Publication Data

US 2011/0228469 A1  Sep. 22, 2011

(51) Int. Cl.
*H05K 5/00* (2006.01)
*H05K 7/00* (2006.01)
*A47B 95/00* (2006.01)
*G11B 33/02* (2006.01)

(52) U.S. Cl. ......... 361/679.33; 361/679.34; 361/679.37; 361/679.38; 361/679.39; 312/333; 369/75.11; 369/75.21

(58) Field of Classification Search .. 361/679.31–679.4, 361/679.55–679.6, 724–727, 679.02, 679.03; 439/60, 151–160, 327, 328, 331, 638
See application file for complete search history.

(56) References Cited

U.S. PATENT DOCUMENTS

5,483,419 A * 1/1996 Kaczeus et al. .......... 361/679.39
7,230,824 B2 * 6/2007 Wei-Chieh et al. ...... 361/679.33
* cited by examiner

*Primary Examiner* — Jayprakash N Gandhi
*Assistant Examiner* — Jerry Wu
(74) *Attorney, Agent, or Firm* — Altis Law Group, Inc.

(57) ABSTRACT

A mounting apparatus includes a chassis, a plurality of first locking members, and a second locking member. The chassis includes a bottom plate and two opposite side plates. The first locking members are secured to the bottom plate. A locking slot is defined in each locking member for receiving fastening members of a disk drive. The second locking member is secured to the bottom plate. A positioning flange is located on the second locking member and configured for abutting the disk drive, for preventing the fastening members from moving out of the locking slots along a direction perpendicular to the bottom plate.

14 Claims, 7 Drawing Sheets

MOUNTING APPARATUS FOR DISK DRIVE

BACKGROUND

1. Technical Field

The present disclosure relates to a mounting apparatus for securing disk drives.

2. Description of Related Art

In a computer system, a plurality of disk drives is used. So, a mounting apparatus is needed to conveniently mount the disk drives in the computer system.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
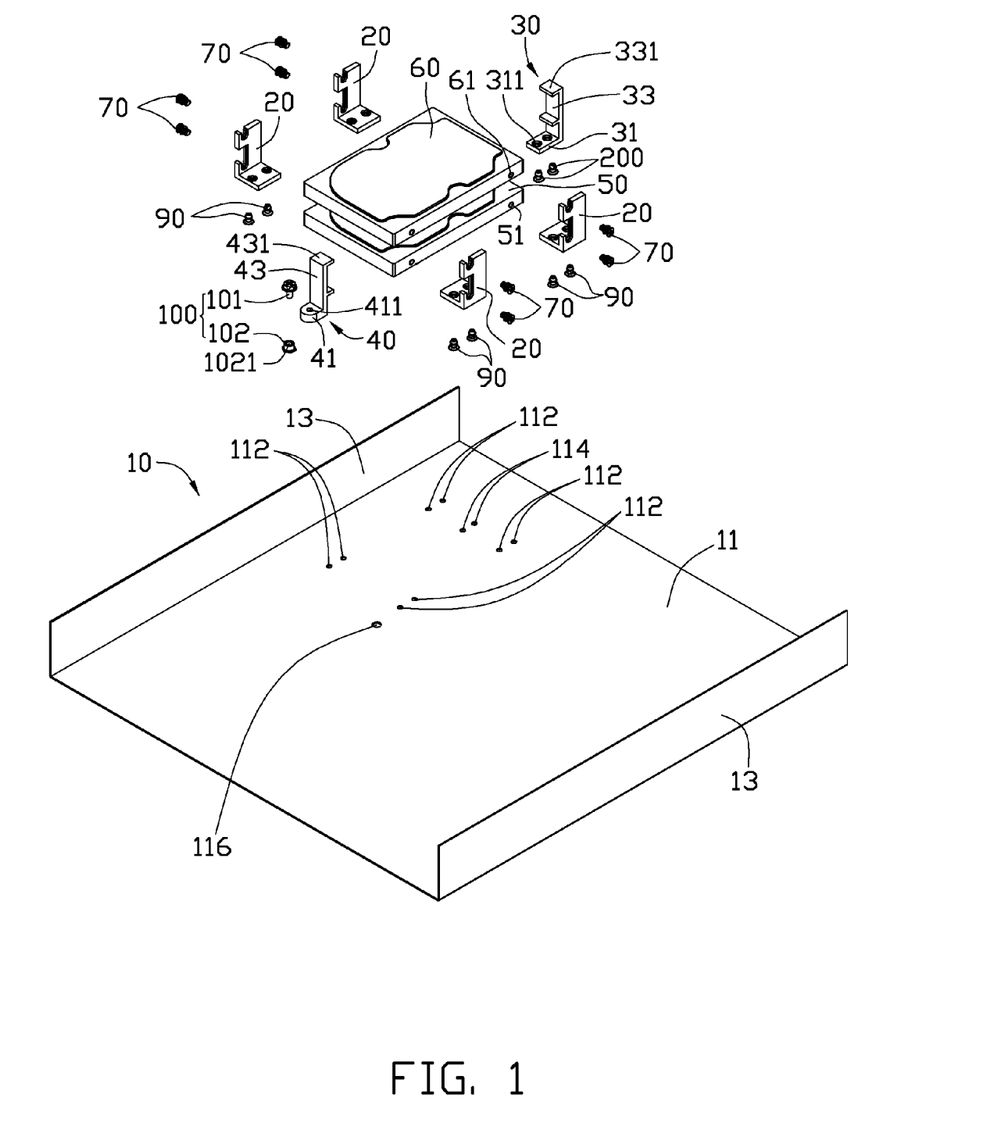
FIG. 1 is an exploded view of a mounting apparatus, a first disk drive, and a second disk drive in accordance with an embodiment.

Referring to FIG. 1, a mounting apparatus in accordance with an embodiment is configured for securing a first disk drive 50 and a second disk drive 60. The first disk drive 50 is the same as the second disk drive 60. A plurality of first mounting holes 51 is defined in opposite sidewalls of the first disk drive 50. A plurality of second mounting holes 61 is defined in opposite sidewalls of the second disk drive 60. The first mounting holes 51 and the second mounting holes 61 are configured to receive a plurality of fastening members 70.

Figure 3:
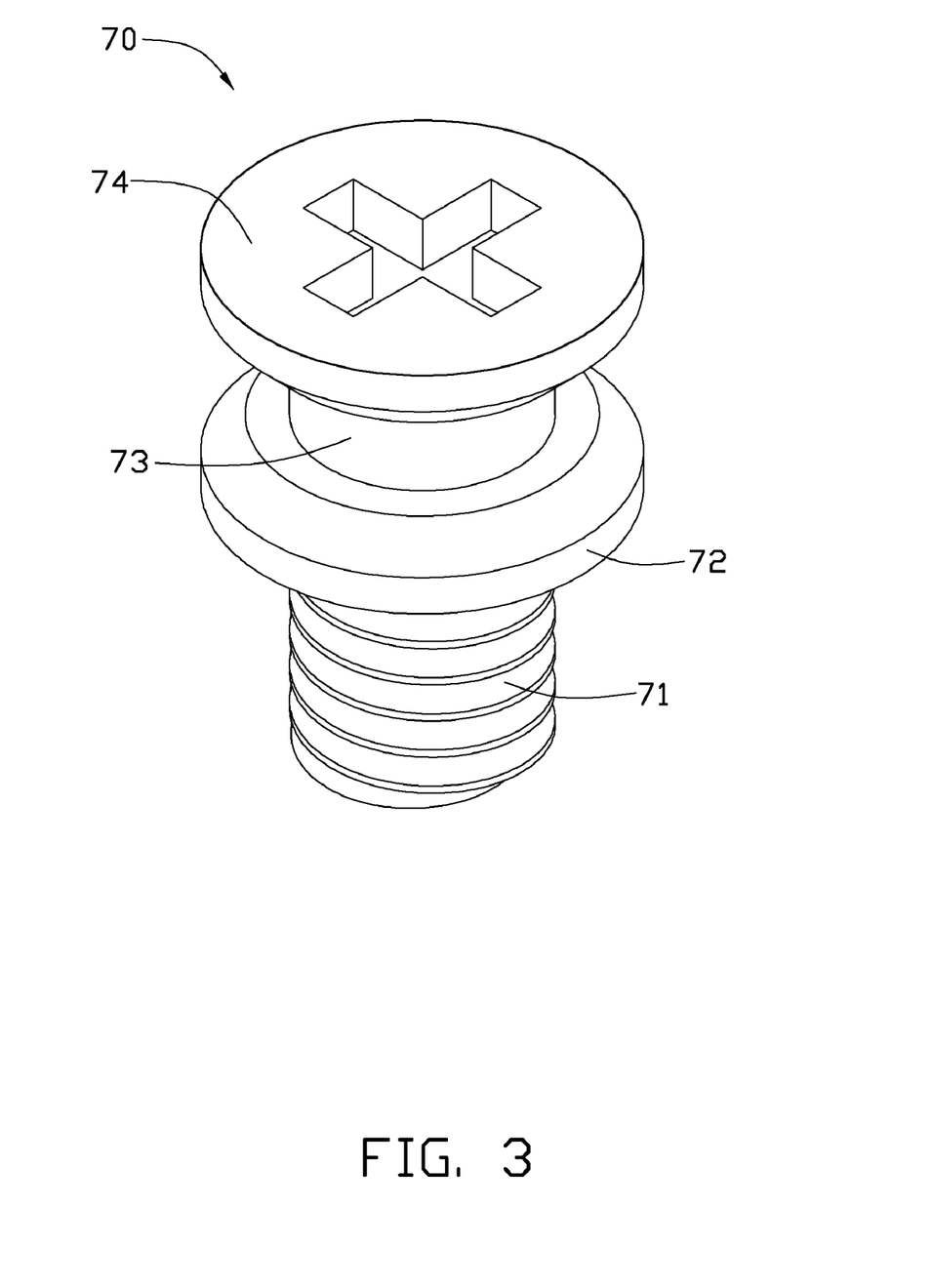
FIG. 3 is an isometric view of a fastening member of FIG. 1.

Referring to FIG. 3, each fastening member 70 includes a threaded portion 71, a positioning portion 72, a neck portion 73 and a head portion 74. The threaded portion 71 is configured for being threaded into the first mounting hole 51 of the first disk drive 50 or the second mounting hole 61 of the second disk drive 60. The positioning portion 72 is located on the threaded portion 71. The neck portion 73 is connected between the positioning portion 72 and the head portion 74. A diameter of the neck portion 73 is smaller than a diameter of the positioning portion 72 and the head portion 74.

Referring to FIG. 1, the mounting apparatus in accordance with an embodiment includes a chassis 10, a plurality of first locking members 20, a second locking member 30, and a third locking member 40.

The chassis 10 includes a bottom plate 11 and two opposite side plates 13. In one embodiment, the side plates 13 are substantially parallel to each other and perpendicular to the bottom plate 11. A plurality of first securing holes 112, second securing holes 114, and a third securing hole 116 are defined in the bottom plate 11. The first securing holes 112 and the second securing holes 114 are disposed in a rectangular area. The pair of the second securing holes 114 is positioned between two pairs of the securing holes 112. The third securing hole 116 is positioned at one side of the rectangular area, opposite to the second securing holes 114.

Figure 2:
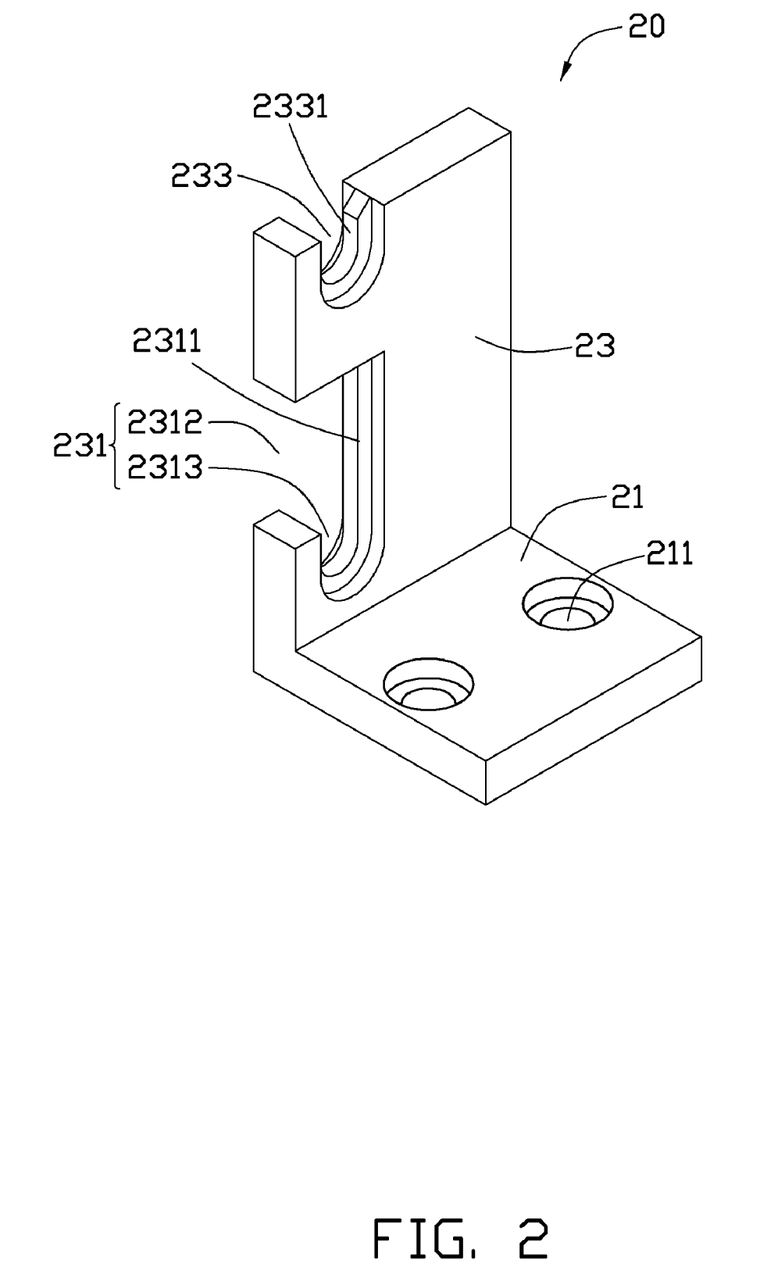
FIG. 2 is an isometric view of a first locking member of FIG. 1.

Referring to FIG. 2, each first locking member 20 includes a base portion 21 and a supporting portion 23 located on the base portion 21. In one embodiment, the supporting portion 23 is substantially perpendicular to the base portion 21. Two first locking holes 211 are defined in the base portion 21, corresponding to the first securing holes 112. A first locking slot 231 and a second locking slot 233 above the first locking slot 231 are defined in the supporting portion 23. A first locking flange 2311 is disposed in the first locking slot 231, and a second locking flange 2331 is disposed in the second locking slot 233. The first locking slot 231 includes an opening 2312 and a receiving portion 2313 communicating with the opening 2312. The receiving portion 2313 is defined in a side edge of the supporting portion 23. The second locking slot 233 is defined in a top edge of the supporting portion 23. In one embodiment, the second locking slot 233 is U-shaped.

Referring to FIG. 1, the second locking member 30 includes a bottom portion 31 and a side portion 33 located on the bottom portion 31. Two second locking holes 311 are defined in the bottom portion 31, corresponding to the second securing holes 114 of the bottom plate 11. Two positioning flanges 331 are located on the side portion 33. In one embodiment, the side portion 33 is substantially perpendicular to the bottom portion 31.

The third locking member 40 includes a mounting portion 41 and a retaining portion 43 located on the mounting portion 41. A third locking hole 411 is defined in the mounting portion 41, corresponding to the third securing hole 116 of the bottom plate 11. Two retaining blocks 431 are located on the retaining portion 43.

Figure 4:
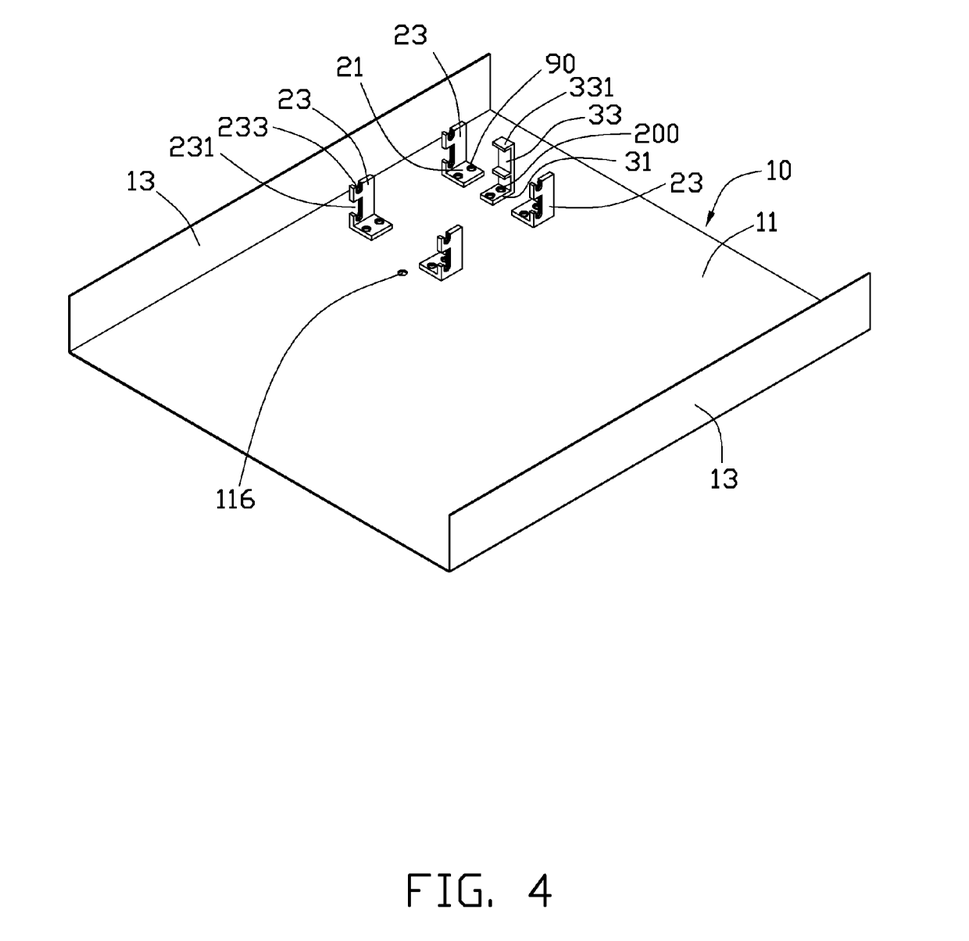
FIG. 4 is an assembled view of the mounting apparatus of FIG. 1, excluding the third locking member.

Referring to FIGS. 1 and 4, in assembly, the first locking members 20 are secured to the bottom plate 11 of the chassis 10, with a plurality of first fasteners 90 (only three pairs of first fasteners shown in FIG. 1) engaged into the first locking holes 211 and the corresponding first securing holes 112. The second locking member 30 is secured to the bottom plate 11, with two second fasteners 200 engaged into the second locking holes 311 and the corresponding second securing holes 114.

Figure 5:
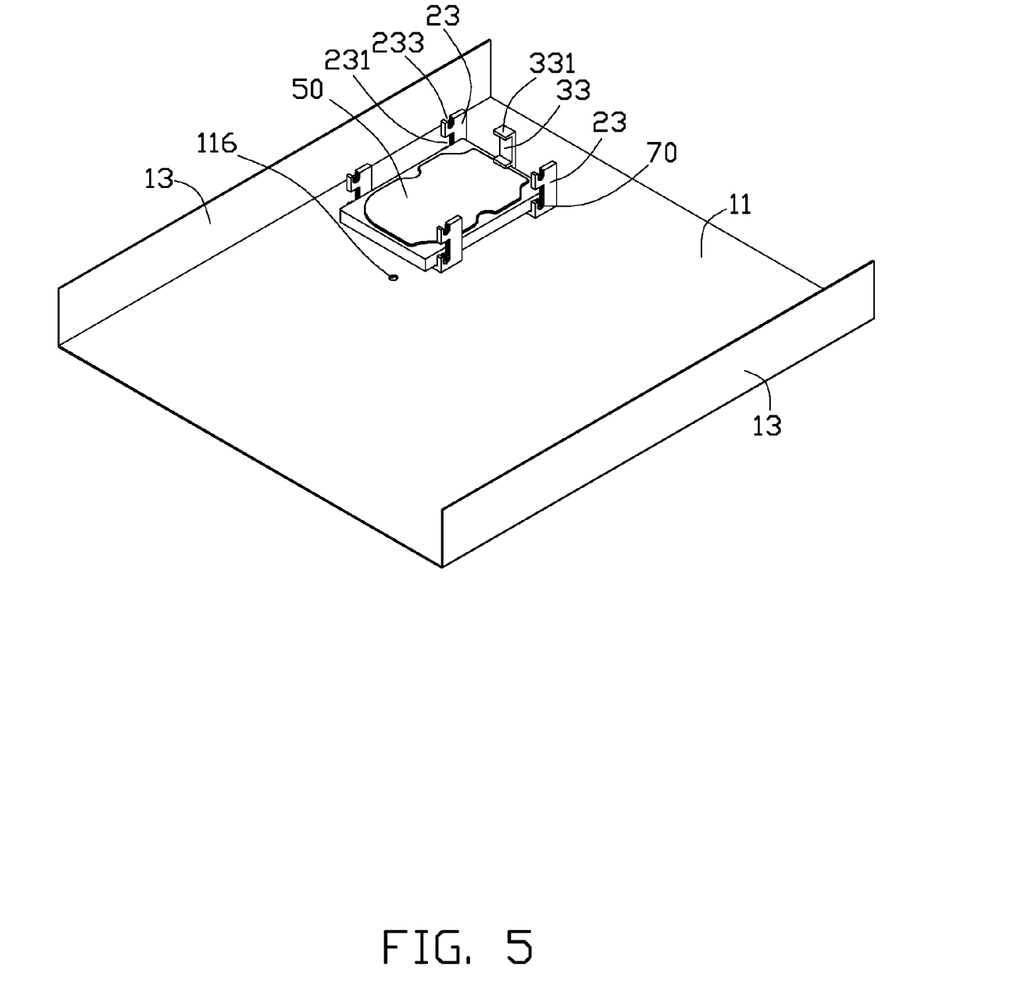
FIG. 5 is similar to FIG. 4, and shows a first disk drive assembled.
Figure 6:
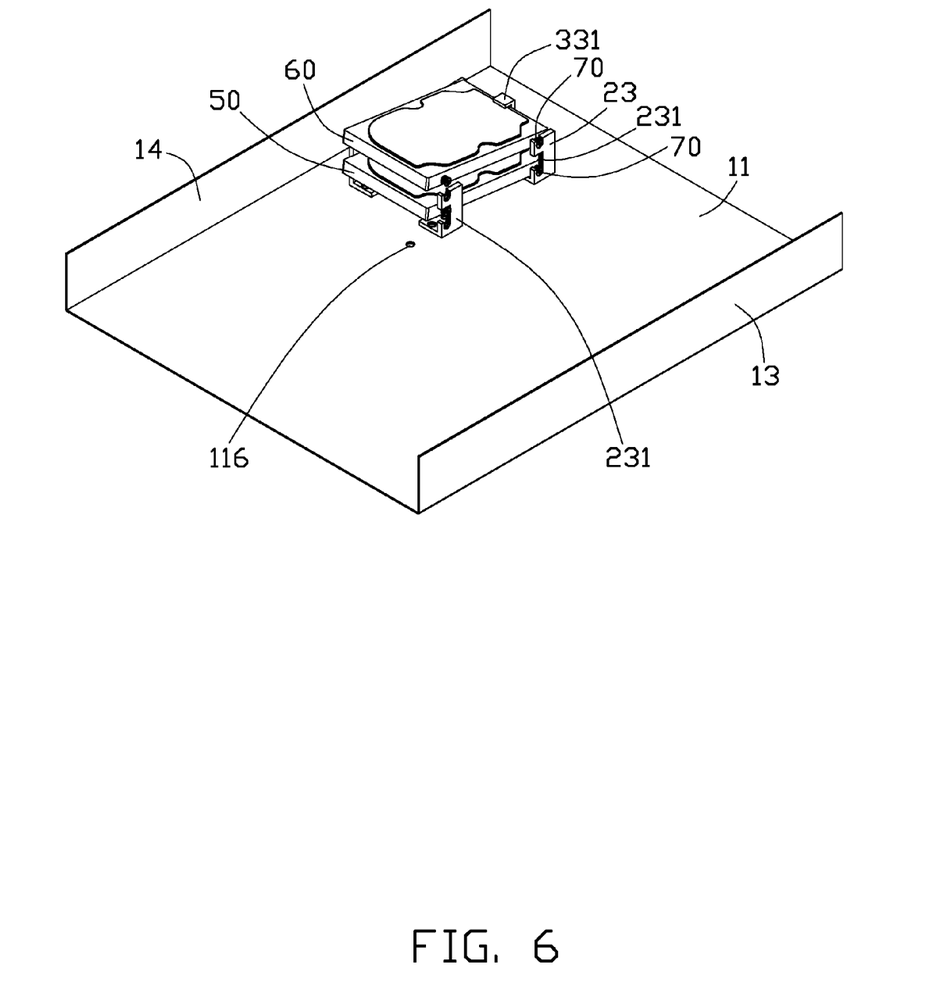
FIG. 6 is similar to FIG. 5, and shows a second disk drive assembled.

Referring to FIGS. 5-6, the fastening members 70 are secured into the first and second mounting holes 51, 61 of the first and second disk drives 50, 60. One end of the first disk drive 50 is engaged between one positioning flange 331 and the bottom portion 31 of the second locking member 30, and one end of the second disk drive 60 is engaged between the two positioning flanges 331 of the second locking member 30. The fastening members 70 on the first disk drive 50 are inserted into the corresponding first locking slots 231 of the first locking members 20 by the opening 2312, and the fastening members 70 on the second disk drive 60 are aligned with the second locking slot 233. The first and second disk drive 50, 60 are rotated downwardly relative to the ends thereof, until the fastening members 70 on the first disk drive 50 are received in the corresponding receiving portions 2313 of the first locking slots 231, and the fastening members 70 on the second disk drive 60 are received in the corresponding second locking slots 233. The first and second locking flanges 2311, 2331 are inserted between the head portions 74 and the positioning portions 72 of the corresponding fastening members 70.

Figure 7:
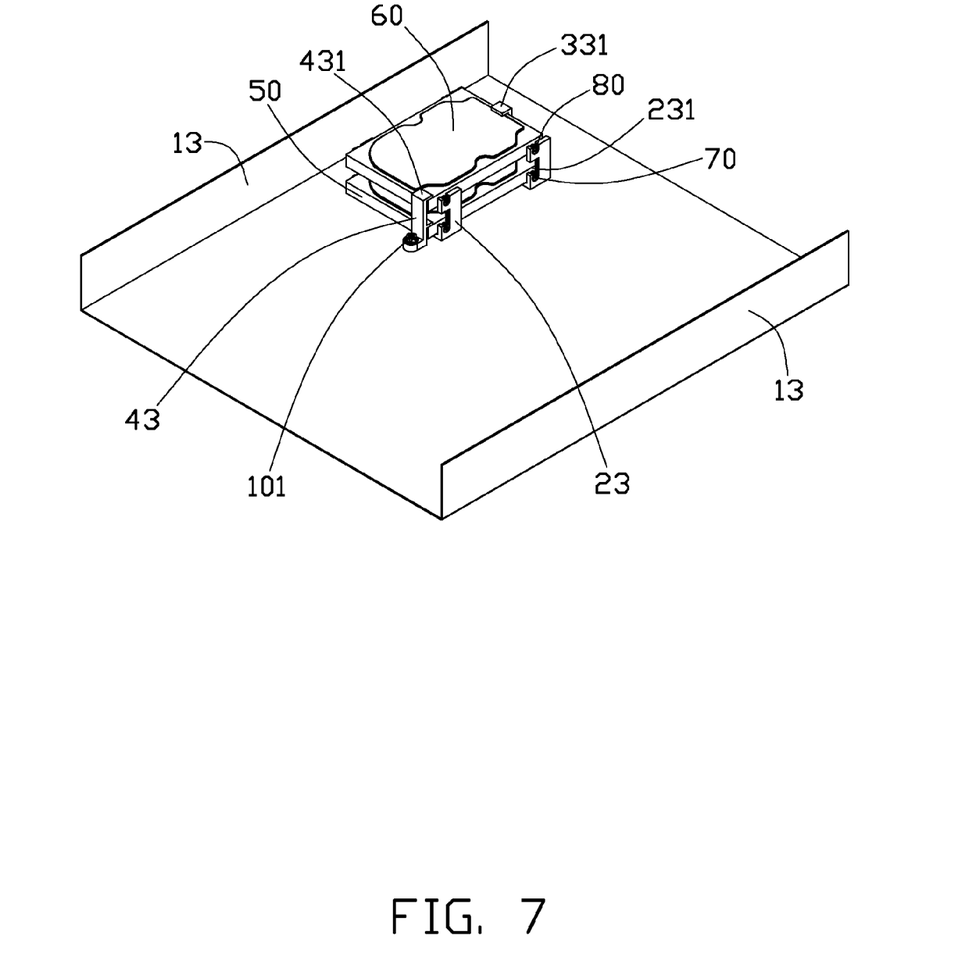
FIG. 7 is similar to FIG. 6, and shows the third locking member securing the first and second disk drives.

Referring to FIGS. 1 and 7, the third locking member 40 is placed on the bottom plate 11 of the chassis 10. The retaining blocks 431 are respectively abut on the first and second disk drives 50, 60. The third locking hole 411 is aligned with the third securing hole 116. A mounting member 100 is used to secure the third locking member 40 to the bottom plate 11 of the chassis 10. Therefore, the first and second disk drives 50, 60 are installed in the chassis 10.

Referring to FIG. 1, the mounting member 100 in accordance with an embodiment includes a mounting post 102 and a screw 101. A threaded hole 1021 is defined in the mounting post 102. The mounting post 102 is secured in the third securing hole 116 of the bottom plate 11. The screw 101 is capable of inserting through the third locking hole 411 to engage in the threaded hole 1021.

In disassembly, the third locking member 40 is removed from the chassis 10. The first and second disk drive 50, 60 are lifted up relative to the ends, which are engaged with the second locking member 30, to disengage the fastening members 70 from the first and second locking slots 231, 233 of the first and second locking members 20. Therefore, the first and second disk drives 50, 60 can be removed from the first locking members 20 and the second locking member 30.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A mounting apparatus comprising:
a chassis comprising a bottom plate;
a plurality of first locking members, secured to the bottom plate along at least one edge of a disk drive, each of the plurality of first locking members comprising a locking slot extended along a direction perpendicular to the bottom plate;
a plurality of fastening members, each of the plurality of fastening members comprising a threaded portion threaded in a mounting hole of the disk drive and a neck portion received in the locking slot of each of the plurality of first locking members; and
a second locking member secured to the bottom plate along another edge of the disk drive which is adjacent to the at least one edge, a positioning flange located on the second locking member extended in parallel with the bottom plate and configured for abutting a top surface the disk drive, for preventing each of the plurality of fastening members from moving out of the locking slot along a direction perpendicular to the bottom plate.

2. The mounting apparatus of claim 1, wherein each of the plurality of first locking members comprises a base portion secured to the bottom plate and a supporting portion perpendicularly extending from the base portion; and the locking slot is defined in the supporting portion.

3. The mounting apparatus of claim 2, wherein the locking slot of each of the plurality of first locking members is defined in a side edge of the supporting portion that is substantially perpendicular to the bottom plate; the locking slot comprises an opening and a receiving portion communicating with the opening; the opening of each of the plurality of first locking members is configured for receiving each of the plurality of fastening members of the disk drive; and the receiving portion is configured for receiving each of the plurality of fastening members of the disk drive.

4. The mounting apparatus of claim 2, wherein the locking slot of each of the plurality of first locking members is defined in a top edge of the supporting portion, which is substantially parallel to the bottom plate.

5. The mounting apparatus of claim 2, wherein a locking flange is located in the locking slot of each of the plurality of first locking members, the neck portion of each of the plurality of fastening members defines an annular groove receiving the locking flange.

6. The mounting apparatus of claim 1, further comprising a third locking member secured to the bottom plate, the third locking member and the second locking member are configured for preventing each of the plurality of fastening members from moving out of the locking slot.

7. The mounting apparatus of claim 6, wherein the third locking member comprising a mounting portion mounted to the bottom plate, a retaining portion perpendicularly extending from the mounting portion, and a retaining block perpendicularly protruding from the retaining portion; the mounting portion and the retaining block are located on two opposite sides of the retaining portion; the retaining block is configured for abutting the disk drive.

8. The mounting apparatus of claim 6, wherein the plurality of first locking members, the second locking member and the third locking member define a rectangular area, for receiving the disk drive.

9. A mounting apparatus comprising:
a chassis comprising a bottom plate;
a plurality of first locking members secured to the bottom plate along at least one edge of a disk drive, each of the plurality of first locking members comprising a base portion and a supporting portion with an opening facing to a direction opposite to the base portion located on the base portion, the supporting portion is configured for supporting each of the plurality of fastening members of a disk drive when the disk drive is assembled from the opening;
a second locking member secured to the bottom plate, a positioning flange located on the second locking member configured for abutting the disk drive on a first edge adjacent to the at least one edge; and
a third locking member comprising a mounting portion secured to the bottom plate, a retaining portion perpendicularly extending from the mounting portion, and a retaining block perpendicularly protruding from the retaining portion, wherein the mounting portion and the retaining block are located on two opposite sides of the retaining portion, the retaining block is configured for abutting the disk drive on a second edge opposite to the first edge and the retaining block together with the positioning flange are configured for preventing the disk drive from moving away from each of the supporting portion.

10. The mounting apparatus of claim 9, wherein each of the plurality of first locking members defines a locking slot for receiving each of the plurality of fastening members.

11. The mounting apparatus of claim 10, wherein the locking slot of each of the plurality of first locking members is defined in a side edge of the supporting portion that is substantially perpendicular to the bottom plate; the locking slot comprises an opening and a receiving portion communicating with the opening; the opening of each of the plurality of first locking members is configured for receiving each of the plurality of fastening members of the disk drive; and the receiving portion is configured for receiving each of the plurality of fastening members of the disk drive.

12. The mounting apparatus of claim 10, wherein the locking slot of each of the plurality of first locking members is defined in a top edge of the supporting portion that is substantially parallel to the bottom plate.

13. The mounting apparatus of claim 10, wherein a locking flange is located in the locking slot of each of the plurality of first locking members and configured for engaging with each of the plurality of fastening members of the disk drive.

14. The mounting apparatus of claim 9, wherein the plurality of first locking members, the second locking member and the third locking member define a rectangular area for receiving the disk drive.

* * * * *

UNITED STATES PATENT AND TRADEMARK OFFICE
CERTIFICATE OF CORRECTION

PATENT NO. : 8,320,115 B2  
APPLICATION NO. : 12/845641  
DATED : November 27, 2012  
INVENTOR(S) : Zheng-Heng Sun Page 1 of 1

It is certified that error appears in the above-identified patent and that said Letters Patent is hereby corrected as shown below:

Title Page, below Item (65) insert:

-- (30)   Foreign Application Priority Data

Mar. 22 2010   (CN) .............................2010 1 0129246 --

Signed and Sealed this  
Twenty-fourth Day of December, 2013

Margaret A. Focarino  
*Commissioner for Patents of the United States Patent and Trademark Office*